(12) United States Patent
Walsh et al.

(10) Patent No.: US 11,741,763 B2
(45) Date of Patent: Aug. 29, 2023

(54) SYSTEMS AND METHODS FOR SYSTEM GENERATED DAMAGE ANALYSIS

(71) Applicant: Allstate Insurance Company, Northbrook, IL (US)

(72) Inventors: Connor Walsh, Lake Forest, IL (US); Rebecca Harasymczuk, Chicago, IL (US); Caleb Brian Slaughter Gore, Buffalo Grove, IL (US); Ryan Carmichael, Wheeling, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/232,231

(22) Filed: Dec. 26, 2018

(65) Prior Publication Data
US 2020/0211303 A1  Jul. 2, 2020

(51) Int. Cl.
  *G07C 5/08* (2006.01)
  *G06N 20/00* (2019.01)
  *G06N 7/00* (2006.01)
  *G06N 7/01* (2023.01)

(52) U.S. Cl.
  CPC ........... *G07C 5/0833* (2013.01); *G06N 7/005* (2013.01); *G06N 20/00* (2019.01); *G07C 5/085* (2013.01); *G07C 5/0808* (2013.01); *G07C 5/0825* (2013.01)

(58) Field of Classification Search
  CPC .................................................... G06T 7/004
  See application file for complete search history.

(56) References Cited

U.S. PATENT DOCUMENTS

| | | | |
|---|---|---|---|
| 6,043,813 A | 3/2000 | Stickney et al. | |
| 6,351,893 B1 | 3/2002 | St. Pierre | |
| 7,100,654 B2 * | 9/2006 | Boiocchi | B60C 17/06 |
| | | | 152/381.6 |
| 7,792,690 B2 | 9/2010 | Wahlbin et al. | |

(Continued)

FOREIGN PATENT DOCUMENTS

| | | |
|---|---|---|
| CN | 201525224 U | 7/2010 |
| CN | 102564403 B | 11/2014 |

(Continued)

OTHER PUBLICATIONS

Baecker et al, Mobile First Notice of Loss: Claim Assistance in your Pocket, Jan. 2009, 5 pages.

(Continued)

*Primary Examiner* — Jean Paul Cass
(74) *Attorney, Agent, or Firm* — Foley & Lardner LLP

(57) ABSTRACT

Systems, methods, and computer-readable media, are disclosed in which a variety of data describing the condition of an object can be obtained and probabilistic likelihoods of causes and/or value of damages to the object can be calculated. In a variety of embodiments, data obtained from third-party systems can be utilized in these calculations. Any of a number of machine classifiers can be utilized to generate the probabilistic likelihoods and confidence metrics in the calculated liabilities. A variety of user interfaces for efficiently obtaining and visualizing the object, the surrounding geographic conditions, and/or the probabilistic likelihoods can further be utilized as appropriate to the requirements of specific applications of embodiments of the invention.

15 Claims, 11 Drawing Sheets

(56) References Cited

U.S. PATENT DOCUMENTS

| | | | |
|---|---|---|---|
| 8,095,394 B2 | 1/2012 | Nowak et al. | |
| 8,521,339 B2* | 8/2013 | Gariepy | G05D 1/0094 |
| | | | 701/2 |
| 8,612,090 B2 | 12/2013 | Nielsen et al. | |
| 8,712,893 B1 | 4/2014 | Brandmaier et al. | |
| 8,751,528 B2 | 6/2014 | Huang | |
| 8,903,593 B1 | 12/2014 | Addepalli et al. | |
| 8,954,226 B1 | 2/2015 | Binion et al. | |
| 9,505,494 B1 | 11/2016 | Marlow et al. | |
| 9,639,960 B1* | 5/2017 | Loveland | G06T 7/0004 |
| 9,691,189 B1 | 6/2017 | Creath | |
| 9,721,302 B2* | 8/2017 | Tofte | G06Q 10/06 |
| 9,805,261 B1* | 10/2017 | Loveland | B64F 5/60 |
| 9,805,423 B1* | 10/2017 | Konrardy | G08G 1/147 |
| 9,886,771 B1 | 2/2018 | Chen et al. | |
| 9,940,834 B1 | 4/2018 | Konrardy et al. | |
| 10,102,590 B1* | 10/2018 | Farnsworth | G06Q 40/08 |
| 10,137,984 B1* | 11/2018 | Flick | G05D 1/102 |
| 10,169,856 B1* | 1/2019 | Farnsworth | G06T 7/254 |
| 10,253,995 B1* | 4/2019 | Grant | F24F 11/30 |
| 10,373,387 B1* | 8/2019 | Fields | G06Q 40/08 |
| 10,410,291 B1* | 9/2019 | Binion | G01C 23/00 |
| 10,475,127 B1* | 11/2019 | Potter | B60W 40/09 |
| 10,489,976 B2 | 11/2019 | Jin et al. | |
| 10,497,108 B1* | 12/2019 | Knuffman | G06T 7/0008 |
| 10,497,250 B1* | 12/2019 | Hayward | G06Q 10/10 |
| 10,510,142 B1* | 12/2019 | Dohner | G06T 7/0008 |
| 10,552,913 B1* | 2/2020 | Brandmaier | G06F 16/51 |
| 10,572,944 B1* | 2/2020 | Brandmaier | G06Q 40/08 |
| 10,593,109 B1* | 3/2020 | Floyd | G06Q 50/163 |
| 10,635,903 B1* | 4/2020 | Harvey | G06T 7/0002 |
| 10,668,929 B2* | 6/2020 | Tochioka | B60W 40/09 |
| 10,685,400 B1* | 6/2020 | Brandmaier | G06Q 40/08 |
| 10,832,331 B1* | 11/2020 | Davis | G07C 5/08 |
| 11,562,436 B2 | 1/2023 | Seth et al. | |
| 2010/0030540 A1 | 2/2010 | Choi et al. | |
| 2010/0036683 A1 | 2/2010 | Logan | |
| 2013/0317864 A1* | 11/2013 | Tofte | G06Q 10/06 |
| | | | 705/4 |
| 2013/0317865 A1* | 11/2013 | Tofte | G06Q 40/08 |
| | | | 705/4 |
| 2014/0058763 A1 | 2/2014 | Zizzamia et al. | |
| 2014/0365029 A1* | 12/2014 | Sugimoto | G08G 1/0112 |
| | | | 701/1 |
| 2015/0057836 A1 | 2/2015 | Plante et al. | |
| 2015/0084757 A1 | 3/2015 | Annibale et al. | |
| 2015/0186953 A1* | 7/2015 | Gross | G06T 1/0007 |
| | | | 705/14.58 |
| 2015/0318015 A1 | 11/2015 | Bose et al. | |
| 2016/0171622 A1 | 6/2016 | Perkins et al. | |
| 2016/0171864 A1 | 6/2016 | Ciaramelletti et al. | |
| 2016/0271796 A1* | 9/2016 | Babu | B25J 11/0075 |
| 2017/0053461 A1 | 2/2017 | Pal et al. | |
| 2017/0148102 A1* | 5/2017 | Franke | G06Q 30/0278 |
| 2017/0206648 A1* | 7/2017 | Marra | G01C 21/20 |
| 2017/0221110 A1* | 8/2017 | Sullivan | G06K 9/78 |
| 2017/0256051 A1* | 9/2017 | Dwivedi | G06T 7/13 |
| 2017/0270650 A1* | 9/2017 | Howe | G06T 7/62 |
| 2018/0075538 A1 | 3/2018 | Konrardy et al. | |
| 2018/0122246 A1* | 5/2018 | Clark | G06K 9/0063 |
| 2018/0155057 A1* | 6/2018 | Irish | G05D 1/0094 |
| 2018/0260793 A1* | 9/2018 | Li | G06N 3/084 |
| 2018/0293664 A1* | 10/2018 | Zhang | G06Q 40/08 |
| 2018/0336418 A1* | 11/2018 | Splittstoesser | G06K 9/00704 |
| 2018/0341821 A1 | 11/2018 | Hovis et al. | |
| 2019/0073641 A1* | 3/2019 | Utke | G06T 7/0004 |
| 2019/0118945 A1* | 4/2019 | Loveland | H04N 5/232 |
| 2019/0180105 A1* | 6/2019 | Sasson | G06N 20/00 |
| 2020/0082168 A1* | 3/2020 | Fathi | B64C 39/024 |
| 2020/0098205 A1* | 3/2020 | Dugas | G06T 7/00 |
| 2020/0133254 A1* | 4/2020 | Cella | G06N 5/046 |
| 2020/0151833 A1* | 5/2020 | Bellaish | G06K 9/6256 |
| 2020/0234488 A1* | 7/2020 | Holzer | G06T 17/00 |
| 2020/0234493 A1* | 7/2020 | Floyd | G06Q 50/163 |

FOREIGN PATENT DOCUMENTS

| | | |
|---|---|---|
| CN | 204222485 U | 3/2015 |
| CN | 105869196 A | 8/2016 |
| CN | 110081860 A | 8/2019 |
| JP | H11203496 A | 7/1999 |
| JP | 2003280520 A | 10/2003 |
| KR | 100823827 B1 | 4/2008 |
| TW | 201039270 A | 11/2010 |
| TW | I630132 B | 7/2018 |

OTHER PUBLICATIONS

Insurtech is Ignoring 2/3 of Opportunity, first notice of loss Archives—Insurance Thought Leadership, Insurancethoughtleadership.com/tag/first-notice-of-loss, Jul. 16, 2018, pp. 1-10.

Digital/McKinsey, Digital disruption in insurance: Cutting through the noise, Mar. 2017, 112 pages.

Andrea Dal Pozzolo et al, Comparison of Data Mining Techniques for Insurance Claim Prediction, Anno Accademico 2010/2011, pp. 1-81.

FNOL Incident Detection, Telematics First Notice of Loss (FNOL) Claim and Incident Reporting, https://www.intellimec.com/fnol-process-telematics-insurance, Jul. 17, 2018, pp. 1-6.

SmartDraw Accident Reconstruction Drawing and Sketch—How to Draw, Examples, and More, www.smartdraw.com/accident-reconstruction, May 14, 2020.

AccidentSketch Draw the diagram of your accident sketch online and free, www.accidentsketch.com, May 14, 2020.

Virtual Crash Accident Reconstruction Software, www.vcrashusa.com/features, May 15, 2020.

Design Ware Inc. 3D Crime, Fire and Traffic Accident Scene Reconstruction Software for the Law Enforcement Professional, www.designwareinc.com/ACCIDENT.htm, May 15, 2020.

Mar. 5, 2021—(CA) Office Action—App. No. 3065731.

Foreign Action other than Search Report on CA 3065731 dated Jan. 28, 2022.

Office Action for Canadian Patent App. No. 3,065,731 dated Dec. 14, 2022, 4 pages.

Office Action for Canadian Patent App. No. 3065731 dated Jan. 28, 2022, 6 pages.

Non-Final Office Action on U.S. Appl. No. 17/141,741 dated Jun. 28, 2023.

\* cited by examiner

Claim # 1234567890 | Expand Analysis | Sign Out

CLAIM STATUS
○ OPEN

FACTS OF LOSS
≡ CLAIM DASHBOARD
☒ SCENE VISUALIZATION
◇ STATEMENTS
≡ DAMAGES

LIABILITY ANALYSIS
[THEORY OF DEFENSE »]

Statements

Statement from Insured J. Smith

Insured Statement
1:24 ——————————— 5:66
⊠  ▷  ⋈

Statement Summary
Insured was travelling on 11th St and planning proceeding straight across Sheby Rd. Insured was at a complete stop when light turned green and he started through intersection. Insured did not see claimant entering roadway when he started moving. Insured advised next he knew, he felt impact on left side of vehicle. Insured advised he was not hurt but did sustain damaged to vehicle. Both insd and Clmt braked in order to avoid the accident but were not able to do so in time. Insd was using his turn signal. Insd had the right of way as he was proceeding straight through the interaction.

[Add to Analysis]

Statement from Claimant M. Jones
△ No recording uploaded

Statement Summary
No statement summary provided

[Request Statement]

Supporting Documents

☒ Map

☒ Scene Visualization

FIG. 6C

Claim # 1234567890

CLAIM STATUS
○ OPEN

FACTS OF LOSS
≡ CLAIM DASHBOARD
☒ SCENE VISUALIZATION
⬥ STATEMENTS
≡ DAMAGES

LIABILITY ANALYSIS
[ THEORY OF DEFENSE ⌄ ]

[ Expand Analysis ]   | Sign Out

Photos

Photos from Insured J. Smith

Insured
J. Smith
Date Uploaded    Vehicle              MOI
6/28/2017        2012 Nissan Versa    Captured by Insured

[23 Photos / View Gallery]
[ Upload Photos ]

Photos from Claimant M. Jones

Claimant
M. Jones
Date Uploaded    Vehicle              MOI
n/a              2008 Pontiac G6      n/a

[0 Photos]
[ Upload Photos ]

Supporting Documents

☒ Map

☒ Scene Visualization

☒ Statement-Insured
The light was green when he initiated cross of Shelby Rd.

SYSTEMS AND METHODS FOR SYSTEM GENERATED DAMAGE ANALYSIS

FIELD OF THE INVENTION

Aspects of the disclosure relate to data processing systems and more specifically to processing vehicular data to analyze damage.

BACKGROUND

The processing of accident data can be a time-consuming and complex process for both a claimant and a processor. The claimant often provides a variety of data to the processor. The processor assesses the damage for which compensation is sought. This process can involve paperwork processing, telephone calls, and potentially face-to-face meetings between claimant and processor. In addition, a significant amount of time (weeks or months) can elapse between the initiation of the process and the final settlement of the claim.

SUMMARY OF THE INVENTION

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

As will be discussed more fully herein, arrangements described herein are directed to methods, computer-readable media, and apparatuses are disclosed in which a variety of data describing the condition of an object can be obtained and probabilistic likelihoods of causes and/or value of damages to the object can be calculated. Aspects of the disclosure involve a guided digital assistant that analyzes various information to automatically calculate likelihoods of causes and/or value of damages to the object. The system is designed with flexibility and reusability to take decisions in claims and liability and calculate probabilistic likelihoods for particular scenarios utilizing real-time and prescriptive analytics for a liability determination and damage determination. The system may utilize a scene sketch tool application program interface and/or a liability tool user interface and various data sources.

The arrangements described may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present disclosure is illustrated by way of example and is not limited in the accompanying figures in which like reference numerals indicate similar elements and in which:

FIGS. 6A-F illustrate example user interfaces in accordance with embodiments of the invention.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized. As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As will be discussed more fully herein, arrangements described herein are directed to methods, computer-readable media, and apparatuses are disclosed in which a variety of data describing the condition of an object can be obtained and probabilistic likelihoods of causes and/or value of damages to the object can be calculated. In a variety of embodiments, data obtained from third-party systems can be utilized in these calculations. A variety of user interfaces for efficiently obtaining and visualizing the object, the surrounding geographic conditions, and/or the probabilistic likelihoods can further be utilized as appropriate to the requirements of specific applications of embodiments of the invention. These processes may utilize various hardware components (e.g., processors, communication servers, memory devices, sensors, etc.) and related computer algorithms to examine an object and generate information describing damage caused to the object. These and various other arrangements will be described more fully herein.

Systems and Devices

Figure 1:
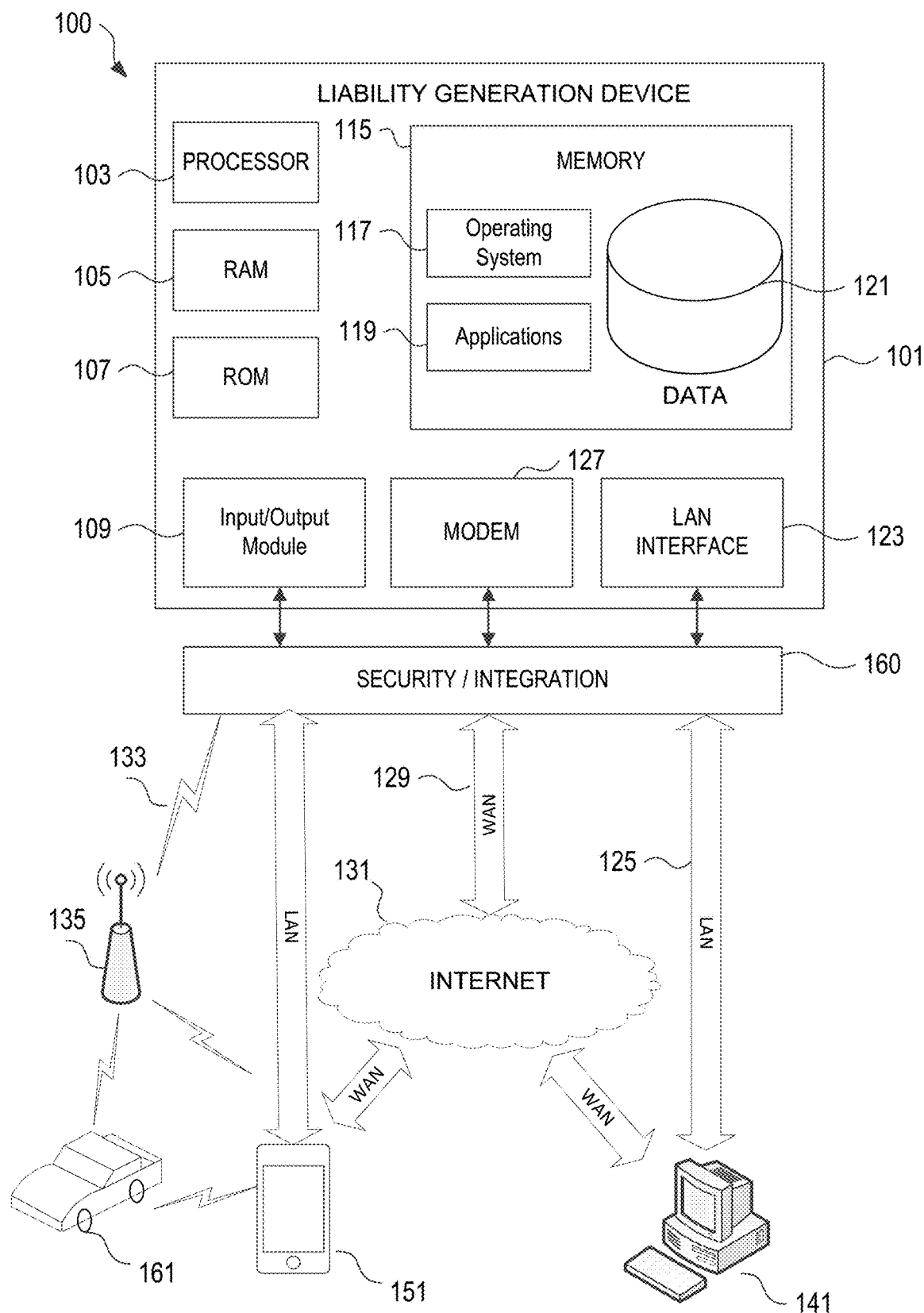
FIG. 1 illustrates one example operating environment in which one or more aspects described herein may be implemented.

FIG. 1 illustrates a block diagram of a liability generation device 101 in an event interpretation system 100 in accordance with an embodiment of the invention. The liability generation device 101 may have a processor 103 for controlling overall operation of the device 101 and its associated components, including RAM 105, ROM 107, input/output module 109, and memory 115. The liability generation device 101, along with one or more additional devices (e.g., terminal 141, mobile device 151, and/or security and integration hardware 160) may correspond to any of multiple systems or devices described herein, such as personal mobile devices, vehicle-based computing devices, insurance systems servers, third-party server systems, internal data sources, external data sources, and other devices in an event interpretation system. These various computing systems may be configured individually or in combination, as described herein, for receiving signals and/or transmissions from one or more computing devices, the signals or transmissions including data related to location of a vehicle, operating parameters of the vehicle, damage to the vehicle, and the like, processing the signals or transmissions to determine a location of the vehicle, operating parameters of the vehicle, causes of damage associated with the vehicle, apportionment of the damage to the vehicle, and the like, using the devices of the event interpretation systems described herein. In addition to the features described above, the techniques described herein also may be used for generating and displaying one or more different types of notifications, obtaining additional information regarding the vehicle, and the like.

Input/output (I/O) 109 may include a microphone, keypad, touch screen, and/or stylus through which a user of the liability generation device 101 may provide input, and may also include one or more of a speaker for providing audio output and a video display device for providing textual, audiovisual, and/or graphical output. Software may be stored within memory 115 and/or storage to provide instructions to processor 103 allowing liability generation device 101 to perform various actions. For example, memory 115 may store software used by the device 101, such as an operating system 117, application programs 119, and/or an associated internal database 121. The various hardware memory units in memory 115 may include volatile and nonvolatile, removable and non-removable media implemented in any method or technology for storage of information such as computer-readable instructions, data structures, program modules or other data. Certain devices and systems within event interpretation systems may have minimum hardware requirements in order to support sufficient storage capacity, processing capacity, analysis capacity, network communication, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 and its associated components may allow the liability generation device 101 to execute a series of computer-readable instructions, for example, receive signals or transmissions including location information, vehicle operation information, scan for diagnostic codes, and the like, to determine a location of the vehicle, determine causes and/or extent of damage to the vehicle, control the amount and type of data received, and the like.

The mobile device 151 (e.g., a personal mobile device, vehicle-based system, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the liability generation device 101. The network connections depicted in FIG. 1 include a local area network (LAN) 125, a wide area network (WAN) 129, and a wireless telecommunications network 133, but may also include fewer or additional networks. When used in a LAN networking environment, the liability generation device 101 may be connected to the LAN 125 through a network interface or adapter 123. When used in a WAN networking environment, the liability generation device 101 may include a modem 127 or other means for establishing communications over the WAN 129, such as network 131 (e.g., the Internet). When used in a wireless telecommunications network 133, the liability generation device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133. It should be noted that, in a variety of embodiments, the liability generation device 101 is implemented using mobile device 151. In many embodiments, the liability generation device 101 communicates with mobile device 151 to cooperatively implement and perform the systems and methods described herein.

Also illustrated in FIG. 1 is a security and integration layer 160, through which communications are sent and managed between the liability generation device 101 (e.g., a personal mobile device, a vehicle-based computing device, an event interpretation server or computing platform, an intermediary server and/or third-party server systems, etc.) and the remote devices (141, 151, and 161) and remote networks (125, 129, and 133). The security and integration layer 160 may include one or more separate computing devices, such as web servers, authentication servers, and/or various networking components (e.g., firewalls, routers, gateways, load balancers, etc.), having some or all of the elements described above with respect to the liability generation device 101. As an example, a security and integration layer 160 of a liability generation device 101 may include a set of web application servers configured to use secure protocols and to insulate the liability generation device 101 from external devices 141, 151, and 161. In some cases, the security and integration layer 160 may correspond to a set of dedicated hardware and/or software operating at the same physical location and under the control of same entities as liability generation device 101. For example, security and integration layer 160 may correspond to one or more dedicated web servers and network hardware in a vehicle and driver information datacenter or in a cloud infrastructure supporting cloud-based vehicle identification, location identification, vehicle operational parameters identification, issue detection, and the like. In other examples, the security and integration layer 160 may correspond to separate hardware and software components which may be operated at a separate physical location and/or by a separate entity.

As discussed herein, the data transferred to and from various devices in an event interpretation system 100 may include secure and sensitive data, such as confidential vehicle operation data, insurance policy data, and confidential user data from drivers and passengers in vehicles. Therefore, it may be desirable to protect transmissions of such data using secure network protocols and encryption, and also to protect the integrity of the data when stored on the various devices within a system, such as mobile devices, vehicle-based devices, insurance servers, event interpretation servers, third-party server systems, or other computing devices in the event interpretation system 100, using the security and integration layer 160 to authenticate users and restrict access to unknown or unauthorized users. In various implementations, security and integration layer 160 may provide, for example, a file-based integration scheme or a service-based integration scheme for transmitting data between the various devices in event interpretation system 100. Data may be transmitted through the security and integration layer 160 using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various liability generation devices 101 in the event interpretation system 100 and/or the security and integration layer 160. Web services may be accessed by authorized external devices and users to support input, extraction, and manipulation of the data (e.g., vehicle operational data, driver data, location data, damage data, etc.) between the various devices in the event interpretation system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle operational data, location data, damage data and/or web services, or the like, may be implemented in the security and integration layer 160 using the Secure Sockets Layer (SSL) or Transport Layer Security (TLS) protocol to provide secure connections between liability generation devices 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, database of vehicle information, database of location information, database of damage information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of event interpretation systems, such as faster response times and less dependence on network conditions when transmitting and receiving driver information, vehicle information, location information, liability generation issue information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in event interpretation system components described herein may be configured to communicate using any of these network protocols or technologies.

Additionally, one or more application programs 119 may be used by the various liability generation devices 101 within the event interpretation system 100 (e.g., vehicle operational data, driver data, location data, etc.), including computer executable instructions for receiving and analyzing various signals or transmissions including location information, vehicle operating data, other vehicle operating data, and the like, determining a location of a vehicle, determining a cause of damage to the vehicle, controlling an amount or type of data transmitted or received and the like.

Liability generation device 101 and/or terminals 141, 151, 161 may also be mobile and/or portable terminals including various other components, such as a battery, speaker, and antennas (not shown). In this regard, liability generation device 101 may be a handheld or otherwise portable device that may be used to scan and process a vehicle from a variety of angles.

Figure 2:
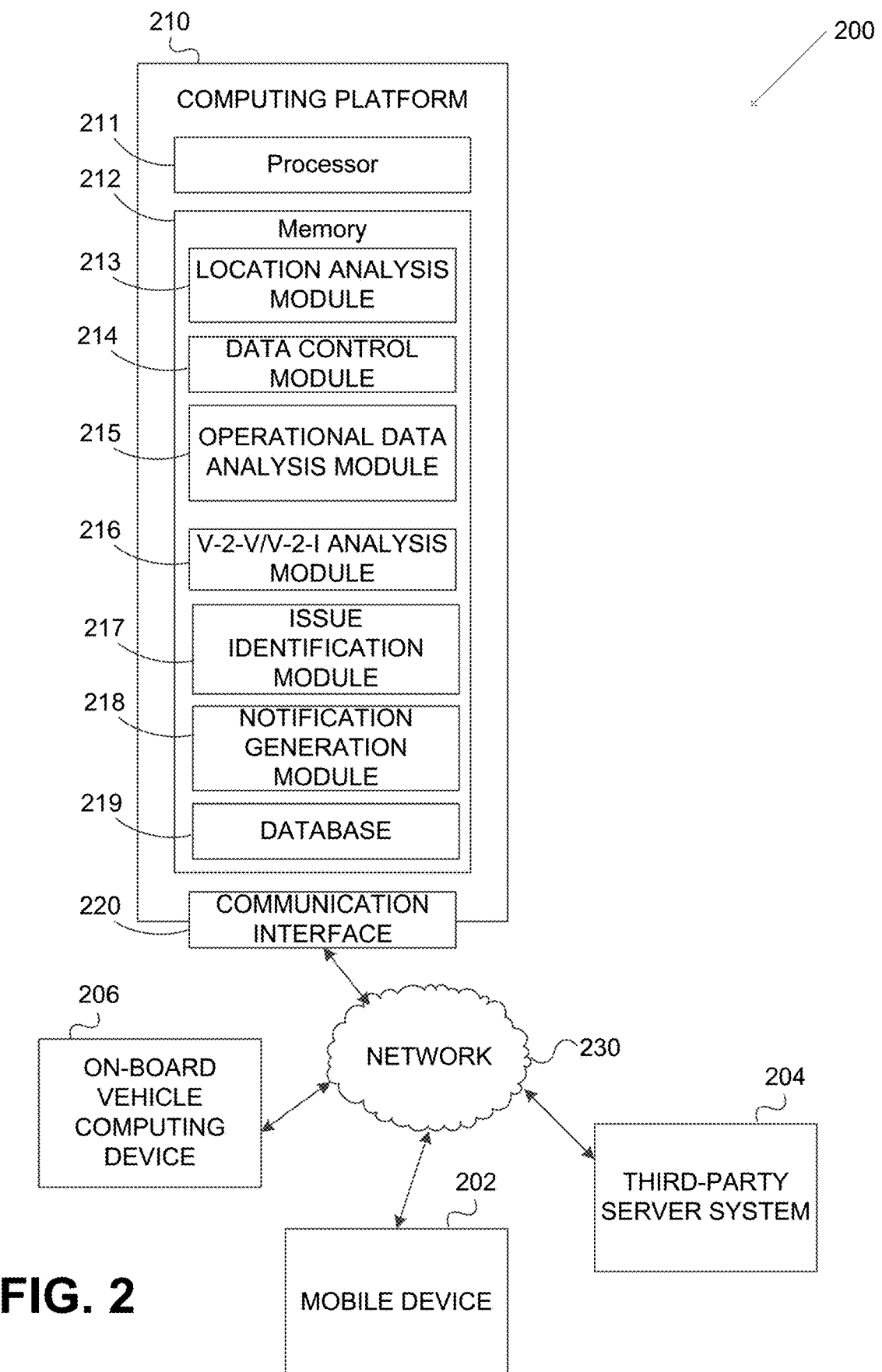
FIG. 2 illustrates one example system in accordance with one or more aspects described herein.

FIG. 2 depicts an environment 200 including an illustrative computing platform 210 for determining a location of a vehicle, determining that the vehicle has been damaged, and calculating liability and/or valuations of the damage to the vehicle according to one or more aspects described herein. For instance, the environment 200 includes a computing platform 210, which may include one or more processors 211, memory 212, and communication interface 220. A data bus may interconnect processor(s) 211, memory 212, and communication interface 220. Communication interface 220 may be a network interface configured to support communication between computing platform 210 and one or more networks (e.g., network 230). One or more computing destinations 202, 204, 206 may be in communication with the computing platform 210 (e.g., via network 230). Memory 212 may include one or more program modules having instructions that when executed by processor(s) 211 cause computing platform 210 to perform one or more functions described herein and/or one or more databases that may store and/or otherwise maintain information which may be used by such program modules and/or processor(s) 211. In some instances, the one or more program modules and/or databases may be stored by and/or maintained in different memory units of computing platform 210 and/or by different computer systems that may form and/or otherwise make up the computing platform 210. In some arrangements, different features or processes performed may be performed by different sets of instructions, such that the processor may execute each desired set of instructions to perform different functions described herein.

For example, memory 212 may include a location analysis module 213. The location analysis module 213 may receive data (e.g., signals or other electronic transmissions), for example, in real-time, including location information of a vehicle. In some examples, the location data may be received from a mobile device 202, which may include, for example, a smartphone, cell phone, tablet computing device, or the like, associated with the user and currently located with or within the vehicle. Global positioning system (GPS) data may be received from the mobile device 202 and processed to determine a current location of the vehicle. In another example, GPS data may be received from one or more sensors located within the vehicle and transmitted via an on-board vehicle computing device 206. The data received may be processed to determine the current location of the vehicle.

Memory 212 may further include a data control module 214. Data control module 214 may be configured to control an amount or type of data collected by one or more sensors, transmitted to computing platform 210, or the like. For example, based on location analysis, vehicle operation data, and the like, the data control module 214 may increase or decrease (e.g., limit) an amount or type of data collected by one or more sensors (e.g., vehicle sensors, user computing device sensors, or the like). In some examples, the data control module 214 may determine an amount or type of data to be collected by the sensors or transmitted to the computing platform 210 and may transmit a command or instruction to a computing device associated with the sensors, such as on-board vehicle computing device 206, user computing device 202, or the like, controlling the amount or type of data collected. The data control module 214 may limit the amount of data transmitted to the computing platform 210 for processing to improve efficiency, conserve computing resources, and the like. The data control module 214 may increase an amount or type of data collected by sensors and/or transmitted to the computing platform 210 to evaluate operational parameters of the vehicle, determine whether the vehicle is damaged, determine a cause or type of issue causing the damage, and the like.

Memory 212 may further include an operational analysis data module 215. Operational analysis data module 215 may be configured to receive data (e.g., signals or other electronic transmissions), for example, in real-time, associated with operating parameters of the vehicle. For instance, data such as current speed, recent historical speeds, and the like, may be received by the operational analysis data module 215 and processed to evaluate operational parameters of the vehicle (e.g., to determine whether the vehicle is damaged). In some examples, data may be received from sensors in a user computing device 202. Data may be received from one or more vehicle based sensors and transmitted via an on-board vehicle computing device 206, telematics device, mobile device 202, or the like.

Memory 212 may further include vehicle-to-vehicle or vehicle-to-infrastructure data analysis module 216. The vehicle-to-vehicle or vehicle-to-infrastructure data analysis module 216 may be configured to receive data via short range vehicle-to-vehicle and/or vehicle-to-infrastructure communications to evaluate operating parameters of other vehicles at or near a location of the vehicle. For instance, the vehicle-to-vehicle or vehicle-to-infrastructure data analysis module 216 may receive data from one or more other vehicles, infrastructure, or the like, at or near a location of the vehicle being evaluated to determine whether the other vehicles are, for example, also damaged or are still moving and, if so, at what speed. This may aid in determining whether the vehicle being evaluated is damaged due to an accident with other vehicle(s) or the like.

Memory 212 may further include issue identification module 217. Issue identification module 217 may be configured to receive data (e.g., signals or other electronic transmissions) to determine whether an issue with a vehicle has occurred and, if so, to determine whether the cause of the issue is an urgent situation reason or a non-urgent situation reason. For example, the issue identification module 217 may receive data indicating that a vehicle is stopped on a highway, that other traffic around the vehicle is still moving, and that the vehicle has been damaged. Accordingly, the issue identification module 217 may scan (e.g., in real-time) the diagnostic codes of the vehicle to determine whether one or more diagnostic codes have been activated. If so, the issue identification module 217 may determine that the vehicle is stopped for an urgent situation reason (e.g., the vehicle has been involved in an accident). If other (or no) diagnostic codes have been activated, in some examples, the issue identification module 217 may determine that the vehicle is stopped for a non-urgent situation reason (e.g., e.g., low tire pressure, low fuel, low battery power, low oil level, to place a phone call, to address an issue within the vehicle, or the like). In many embodiments, a mobile device includes one or more sensors capable of determining diagnostic codes for the vehicle (and/or any of the information described by the diagnostic codes) without a connection to the on-board vehicle diagnostic system. In this way, it should be understood that any vehicle operational data described herein can be captured and/or generated using a mobile device.

Memory 212 may further include a notification generation module 218. Notification generation module 218 may be configured to generate, transmit and/or cause to display one or more different types of notifications based on whether the vehicle is damaged and/or if additional information is needed. For instance, if the vehicle is stopped for an urgent situation reason (e.g., as determined by the issue identification module 217), data may be automatically transmitted to an event interpretation server and a notification may be generated and transmitted to the mobile device 202, on-board vehicle computing device 206, or the like, indicating that damage has been detected and that a request for information has been sent. Additional information regarding the vehicle, its geographic location, and/or the damage may be requested from the third-party server system 204. Third-party server systems 204 can include a variety of data providers, such as external traffic databases containing traffic data (e.g., amounts of traffic, average driving speed, traffic speed distribution, and numbers and types of accidents, etc.) at various times and locations, weather databases containing weather data (e.g., rain, snow, sleet, and hail amounts, temperatures, wind, road conditions, visibility, etc.) at various times and locations, other external data sources containing driving hazard data (e.g., road hazards, traffic accidents, downed trees, power outages, road construction zones, school zones, and natural disasters, etc.), route and navigation information, and/or insurance company databases containing insurance data (e.g., coverage amount, deductible amount, premium amount, insured status) for the vehicle, driver, and/or other nearby vehicles and drivers, and the like. The generated notifications may be transmitted to one or more computing devices, e.g., devices 202, 204, 206, via push notifications, short message service (SMS), via an application executing one or more devices 202, 204, 206, or the like. The computing platform 210 may cause the notifications to display on a display of the one or more computing devices 202, 204, 206.

Computing platform 210 may further include a database 219. The database 219 may include or store information associated with the driver of the vehicle, the vehicle itself, insurance policy information, historical issues detected, and the like. This information may be used to aid in determining when an issue has occurred, what type of issue, and the like. For instance, historical data may indicate that that the vehicle has previously been damaged. Accordingly, this may indicate that the damage to the vehicle should not be reported and/or included in damage and liability event analysis in the event that the vehicle is damaged further at a later point in time.

Although the various modules of the computing platform 210 are described separately, functionality of the various modules may be combined and/or may be performed by a single device or multiple computing devices in communication without departing from the invention. In particular, it should be noted that the computing platform may be implemented in whole or in part by mobile device 202.

Figure 3:
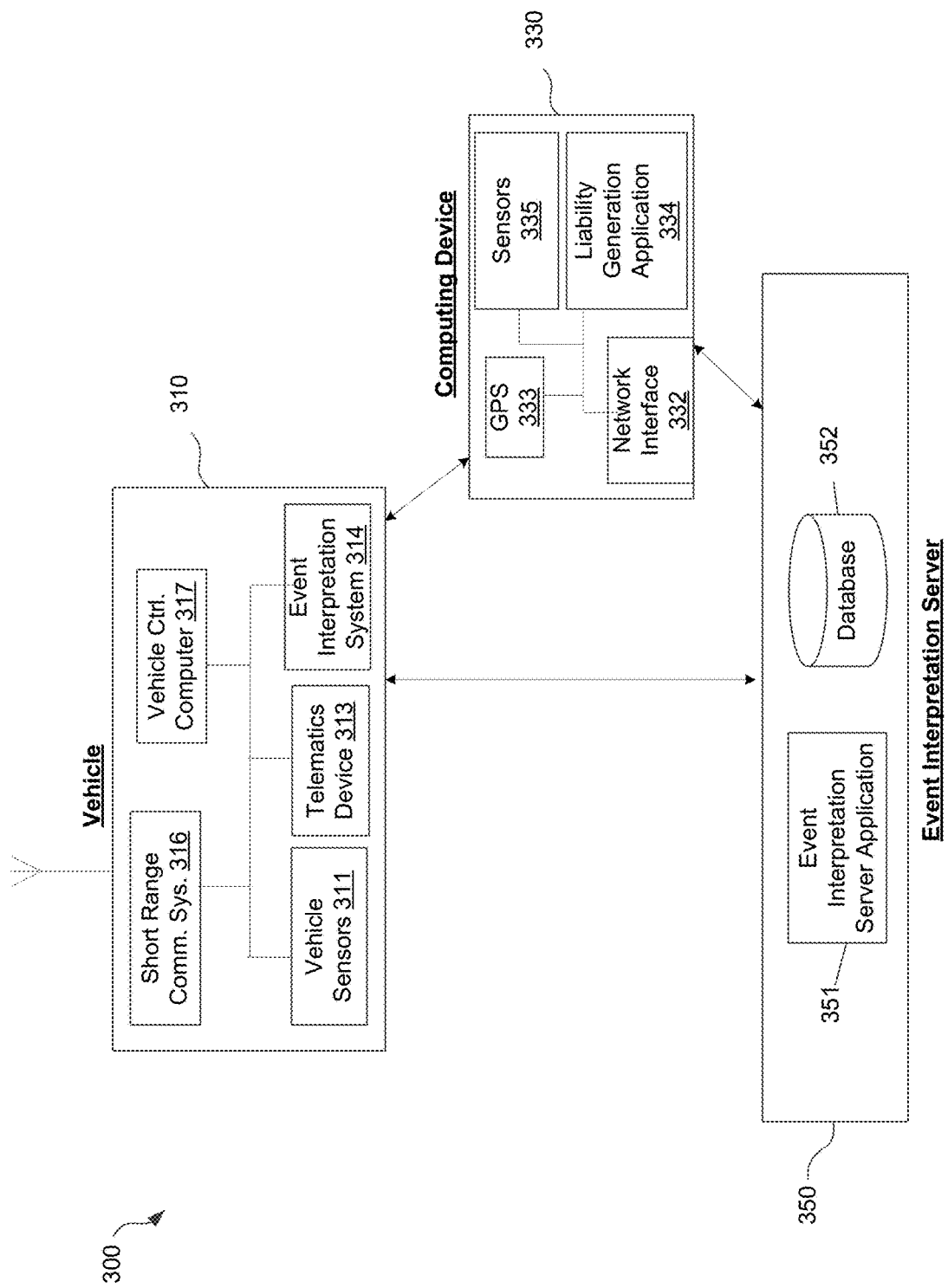
FIG. 3 is another example system in accordance with one or more aspects described herein.

FIG. 3 is a diagram of an illustrative event interpretation system 300. The event interpretation system 300 includes a vehicle 310 (e.g., the vehicle being evaluated for damage), a computing device 330, an event interpretation server 350, and additional related components. As discussed herein, the components of the system 300, individually or using communication and collaborative interaction, may determine a location of vehicle 310, determine whether the vehicle has been damaged, control an amount or type of data received and/or processed, determine the extent of and/or liability of the damage to the vehicle, and/or generate and transmit one or more notifications. To perform such functions, the components shown in FIG. 3 each may be implemented in hardware, software, or a combination of the two. Additionally, each component of the event interpretation system 300 may include a computing device (or system) having some or all of the structural components described herein for computing device 330.

Vehicle 310 in the event interpretation system 300 may be, for example, an automobile, a motorcycle, a scooter, a bus, a recreational vehicle, a boat, or other vehicle for which vehicle operational data, location data, driver data (or operator data), damage data, and/or other driving data (e.g. time data, weather data, etc.) may be collected and/or analyzed. The vehicle 310 includes vehicle operation sensor 311 capable of detecting and recording various conditions at the vehicle and operational parameters of the vehicle. For example, sensor 311 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also may detect and store data received from the vehicle's 310 internal systems, such as impact to the body of the vehicle, air bag deployment, tire status, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems.

Additional sensors 311 may detect and store the external driving conditions, for example, external temperature, rain, snow, light levels, and sun position for driver visibility. For example, external cameras and proximity sensors 311 may detect other nearby vehicles, vehicle spacing, traffic levels, road conditions, traffic obstructions, animals, cyclists, pedestrians, and other conditions that may factor into a liability generation analysis. Sensors 311 also may detect and store data relating to moving violations and the observance of traffic signals and signs by the vehicle 310. Additional sensors 311 may detect and store data relating to the maintenance of the vehicle 310, such as the engine status, oil level, engine coolant temperature, odometer reading, the level of fuel in the fuel tank, engine revolutions per minute, software upgrades, and/or tire pressure. Vehicles sensors 311 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. Sensors 311 also may be configured to collect data relating to a driver's movements or the condition of a driver. For example, vehicle 310 may include sensors that monitor a driver's movements, such as the driver's eye position and/or head position, etc. Additional sensors 311 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors. Certain vehicle sensors 311 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by vehicle sensor 311 may be stored and/or analyzed within the vehicle 310, such as for example by an event interpretation system 314 integrated into the vehicle, and/or may be transmitted to one or more external devices. For example, as shown in FIG. 3, sensor data may be transmitted via a telematics device 313 to one or more remote computing devices, such as computing device 330, event interpretation server 350, and/or other remote devices.

As shown in FIG. 3, the data collected by vehicle sensors 311 may be transmitted to event interpretation server 350, computing device 330, and/or additional external servers and devices via telematics device 313. As discussed herein, the telematics device 313 may receive vehicle operation data and driving data from vehicle sensor 311, and may transmit the data to one or more external computer systems (e.g., event interpretation server 350) over a wireless transmission network. Telematics device 313 also may be configured to detect or determine additional types of data relating to real-time driving and the condition of the vehicle 310. The telematics device 313 also may store the type of vehicle 310, for example, the make, model, trim (or sub-model), year, and/or engine specifications, as well as other information such as vehicle owner or driver information, insurance information, and financing information for the vehicle 310. Telematics device 313 may receive vehicle driving data from vehicle sensor 311, and may transmit the data to an event interpretation server 350. However, in other examples, one or more of the vehicle sensors 311 or systems may be configured to receive and transmit data directly from or to an event interpretation server 350 without using a telematics device. For instance, telematics device 313 may be configured to receive and transmit data from certain vehicle sensors 311 or systems, while other sensors or systems may be configured to directly receive and/or transmit data to an event interpretation server 350 without using the telematics device 313. Thus, telematics device 313 may be optional in certain embodiments. In a variety of embodiments, a mobile device is capable of capturing and/or generating any of the data obtained by a telematics device without a connection to the telematics device. In some examples, telematics, sensor data, and/or other data (e.g., error or issue codes associated with maintenance of a vehicle) may be transmitted (e.g., to event interpretation server) and may be used to further aid in identifying an issue and/or liability for the issue a vehicle may be having.

Vehicle 310 may further include a short-range communication system 316. The short-range communication systems 316 may be vehicle-based data transmission systems configured to transmit vehicle operational data to other nearby vehicles, and to receive vehicle operational data from other nearby vehicles. In some examples, communication system 316 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 316 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system 316 may be sent via DSRC, Bluetooth, satellite, GSM infrared, IEEE 802.11, WiMAX, RFID, and/or any suitable wireless communication media, standards, and protocols. In certain systems, short-range communication system 316 may include specialized hardware installed in vehicles 310 (e.g., transceivers, antennas, etc.), while in other examples the communication system 316 may be implemented using existing vehicle hardware components (e.g., radio and satellite equipment, navigation computers) or may be implemented by software running on the computing device 330 of drivers and passengers within the vehicle 310. The range of V2V communications may depend on the wireless communication standards and protocols used, the transmission/reception hardware (e.g., transceivers, power sources, antennas), and other factors. Short-range V2V communications may range from just a few feet to many miles, and different types of driving behaviors, vehicle operational parameters, and the like, may be determined depending on the range of the V2V communications.

V2V communications also may include vehicle-to-infrastructure (V2I) communications, such as transmissions to or from vehicles to or from non-vehicle receiving devices, such as infrastructure. Infrastructure may include one or more of toll booths, rail road crossings, parking garages, road segments, parking lots, buildings or other structures, and/or road-side traffic monitoring devices which may include one or more sensors for detecting environmental conditions (e.g., weather, lighting, etc.) as well as parking availability. Certain V2V communication systems may periodically broadcast data from a vehicle 310 to any other vehicle or other infrastructure device capable of receiving the communication within the range of the vehicle's transmission capabilities. For example, a vehicle 310 may periodically broadcast (e.g., every 0.1 second, every 0.5 seconds, every second, every 5 seconds, dynamically, etc.) certain vehicle operation data via its short-range communication system 316, regardless of whether or not any other vehicles or reception devices are in range. In other examples, a vehicle communication system 316 may first detect nearby vehicles and receiving devices, and may initialize communication with each by performing a handshaking transaction before beginning to transmit its vehicle operation data to the other vehicles and/or devices. Broadcasts from infrastructure may also have varying ranges and, in some examples, infrastructure may broadcast to an intermediate station which may then relay the information to the event interpretation server 350 (or other device).

The types of vehicle operational data, vehicle driving data, damage data, or the like, transmitted to or from vehicle 310 and/or infrastructure may depend on the protocols and standards used for the V2V or V2I communication, the range of communications, and other factors. In certain examples, vehicle 310 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) may use internal clocks with synchronized time signals and may send transmission times within V2V (or V2I) communications so that the receiver may calculate its distance from the transmitting node based on the difference between the transmission time and the reception time. The state or usage of the vehicle's controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also may be transmitted in V2V (or V2I) communications.

In various other examples, any data collected by any vehicle sensors 311 potentially may be transmitted via V2V or V2I communication to other nearby vehicles or infrastructure devices receiving V2V or V2I communications from communication system 316. Further, additional vehicle driving data not from the vehicle's sensors (e.g., vehicle make/model/year information, driver insurance information, driving route information, vehicle maintenance information, driver scores, etc.) may be collected from other data sources, such as computing device 330, and transmitted using V2V or V2I communications to nearby vehicles and other receiving devices using communication system 316.

The system 300 in FIG. 3 also includes a computing device 330. Computing device 330 may be, for example, a smartphone or other mobile phone, personal digital assistant (PDAs), tablet computer, personal computer, and the like, and may include some or all of the elements described herein. Specifically, it should be noted that some or all of the functionality described with respect to vehicle 310 and/or event interpretation server 350 can be implemented using computing device 330. Computing device 330 may be configured to establish communication sessions with vehicle-based devices and various internal components of vehicle 310 via wireless networks or wired connections (e.g., for docked devices), whereby such mobile devices 330 may have secure access to internal vehicle sensors 311 and other vehicle-based systems. However, in other examples, the computing device 330 might not connect to vehicle-based computing devices and internal components, but may operate independently by communicating with vehicle 310 via their standard communication interfaces (e.g., telematics device 313, etc.), or might not connect at all to vehicle 310.

Computing device 330 may include a network interface 332, which may include various network interface hardware (e.g., adapters, modems, wireless transceivers, etc.) and software components to enable computing device 330 to communicate with event interpretation server 350, vehicle 310, and various other external computing devices. One or more specialized software applications, such as a liability generation application 334, may be stored in the memory of the computing device 330. The liability generation application 334 may be received (e.g., downloaded or otherwise provided) via network interface 332 from the event interpretation server 350, vehicle 310, or other application providers (e.g., application stores). As discussed below, the liability generation application 334 may or may not include various user interface screens, and may be configured to run as user-initiated applications or as background applications. The memory of the computing device 330 also may include databases configured to receive and store vehicle operational data, driving data, driving trip data, and the like, associated with one or more drivers, vehicles, and the like.

Computing device 330 may include various components configured to generate and/or receive vehicle operational data, driver data, driving data, damage data, or other operational data, as well as communicate with other devices within the system 300. Damage data may include at least one indicator of damage to a vehicle. As discussed herein, the liability generation software application 334 may cause the computing device 330 to store and analyze the data from various mobile device components, historical data, and the like, and may use this data, in conjunction with one or more other devices (e.g., event interpretation server 350), to identify a location of a vehicle, determine operational parameters of a vehicle, identify damage to the vehicle, generate, transmit or receive notifications, and the like. Computing device 330 may store, analyze, and/or transmit the data to one or more other devices. For example, computing device 330 may transmit data directly to one or more event interpretation server s 350. As discussed above, the event interpretation server 350 may determine a location of the vehicle being evaluated, control data collected or received and processed by the system, determine operational parameters of the vehicle, identify damage to the vehicle and/or determine liability for the damage, and generate and transmit notifications. In some examples, one or more of these functions may be performed by the processing components of the computing device (e.g., via liability generation application 334). Therefore, in certain arrangements, computing device 330 may be used in conjunction with, or in place of, the event interpretation server 350.

Vehicle 310 may include event interpretation system 314, which may be a separate computing device or may be integrated into one or more other components within the vehicle 310, such as the telematics device 313, autonomous driving systems, or the internal computing systems of vehicle 310. As discussed above, event interpretation system 314 also may be implemented by computing devices independent from the vehicle 310, such as computing device 330 of the drivers or passengers, or one or more separate computer systems (e.g., a user's home or office computer). In any of these examples, the event interpretation system 314 may contain some or all of the hardware/software components of various devices and systems described herein. Further, in certain implementations, the functionality of the event interpretation system, such as storing and analyzing driver data, vehicle operational data, location data, and the like, may be performed in an event interpretation server 350 rather than by the individual vehicle 310 or computing device 330. In such implementations, the vehicle 310 and and/or computing device 330, might only collect and transmit driver data, sensor data, location data, vehicle operational data, and the like to event interpretation server 350, and thus the vehicle-based event interpretation system 314 may be optional.

The system 300 also may include one or more event interpretation server s 350, containing some or all of the hardware/software components described herein. The event interpretation server 350 may include hardware, software, and network components to receive data (e.g., signals or other electronic transmissions) related to location, operational data, and the like, process the data, control an amount or type of data collected by sensors and/or transmitted for processing or analysis, identify damage to a vehicle and/or liability for the damage, generate and transmit notifications, and the like, from one or more of vehicle 310, computing device 330, and other data sources. The event interpretation server 350 may include a database 352 and event interpretation server application 351 to respectively store and analyze driver data, vehicle operational data, sensor data, etc., received from vehicle 310, computing device 330, and/or other data sources. In some examples, the event interpretation server 351 may include many or all of the components of the computing platform 210 described with respect to FIG. 2.

Data may be received by the event interpretation server 350 from vehicle 310 wirelessly via telematics device 313. Additionally, the event interpretation server 350 may receive additional data from other third-party server systems, such as external traffic databases containing traffic data (e.g., amounts of traffic, average driving speed, traffic speed distribution, and numbers and types of accidents, etc.) at various times and locations, weather databases containing weather data (e.g., rain, snow, sleet, and hail amounts, temperatures, wind, road conditions, visibility, etc.) at various times and locations, other external data sources containing driving hazard data (e.g., road hazards, traffic accidents, downed trees, power outages, road construction zones, school zones, and natural disasters, etc.), route and navigation information, and/or insurance company databases containing insurance data (e.g., coverage amount, deductible amount, premium amount, insured status) for the vehicle, driver, and/or other nearby vehicles and drivers, and the like.

Data stored in the database 352 may be organized in any of several different manners. For example, a liability generation table may contain data related to previous liability issues, vehicle features (e.g., organized by make, model, year, etc.), special equipment needs for particular vehicles, images of damage to a vehicle, etc. Other tables in the database 352 may store additional data, including data types discussed above (e.g. traffic information, road-type and road condition information, weather data, insurance policy data, etc.).

The event interpretation server application 351 within the event interpretation server 350 may direct the event interpretation server 350 to retrieve data from the database 352, or may receive data directly from computing device 330, or other data sources, and may perform one or more analyses to evaluate the data received, determine a location of the vehicle, determine whether the vehicle has been damaged, control an amount or type of data collected or transmitted for processing, calculate liability for the damage, generate and transmit notifications, and other related functions. The functions performed by the event interpretation server application 350 may be performed by specialized hardware and/or software separate from the additional functionality of the event interpretation server 350. Such functions and further descriptions and examples of the algorithms, functions, and analyses that may be executed by the event interpretation server 350 are described herein.

In various examples, the liability generation analyses, identifications and determinations may be performed entirely in the event interpretation server 350, may be performed entirely in the vehicle-based event interpretation system 314, or may be performed entirely by the computing device 330. In other examples, certain analyses of data, and the like, may be performed by vehicle-based devices (e.g., within event interpretation system 314) or computing device 330 (e.g., within application 334), while other data analyses are performed by the event interpretation server 350. Various other combinations of devices processing data may be used without departing from the invention.

Event Interpretation Processes

Event interpretation can include obtaining information from a variety of sources, convert that information into relevant facts about actors and assets involved in an event, and automatically making decisions regarding the event and/or the liability for each of the actors involved in the event. Liability data may describe relationships between actors in the event, fault attributable to each of the actors, and/or damages associated with the actors. A variety of data can be obtained regarding damage to a vehicle. In many embodiments, data is obtained when a first notice of loss is received. In a variety of embodiments, a first notice of loss includes audio data from one or more parties describing damage to a vehicle, details of the vehicles involved, the scene in which the accident occurred, the time at which the accident occurred, and/or the conditions that caused the damage. The first notice of loss can include information and/or questions describing prior damage, liability, particulars of an accident, etc. The first notice of loss may be an automated notification of an accident from a telematics device, mobile device, and/or other device. Sensor data captured using sensors within a vehicle, a vehicle telematics device, and/or a mobile device can also be provided. The sensor data can include a variety of aspect regarding the operation of the vehicle, such as speed, acceleration, geographic location, warning lights, impact sensor data, and any other data as appropriate to the requirements of specific applications of embodiments of the invention. In several embodiments, the data is obtained from an on-board vehicle diagnostic system (OBD II) connector located within the vehicle. The information recorded by the diagnostic system may include coolant temperature, engine RPM, vehicle speed, timing advance, throttle position, and the oxygen sensor, vehicle identification code (VIN), make, model, etc. Additional information for the time immediately preceding and immediately subsequent to the accident as well as vehicle identifying information or insured information also may be obtained. The vehicle identifying information may include title details, license plate number, vehicle identification number, and/or vehicle make/model.

Images and/or video of the damage, scene, or any other relevant information can also be provided. The image and/or video data can include a variety of metadata, including depth information, location information, and/or any other data as appropriate to the requirements of specific applications of embodiments of the invention. In many embodiments, some or all of this data can be automatically obtained when a vehicle is involved in an accident and transmitted for processing. The data can be provided piecemeal or, in a number of embodiments, can be packaged into a set of crash data for transmission. In the event that a set of data provided is insufficient to determine liability for the damage, additional data can be requested and provided. In several embodiments, the notification data provided can request specific kinds of data, such as location data, photographs, etc. In a number of embodiments, the requested data is utilized to improve the accuracy of one or more feature vectors generated using any of a variety of machine classifiers.

Figure 4:
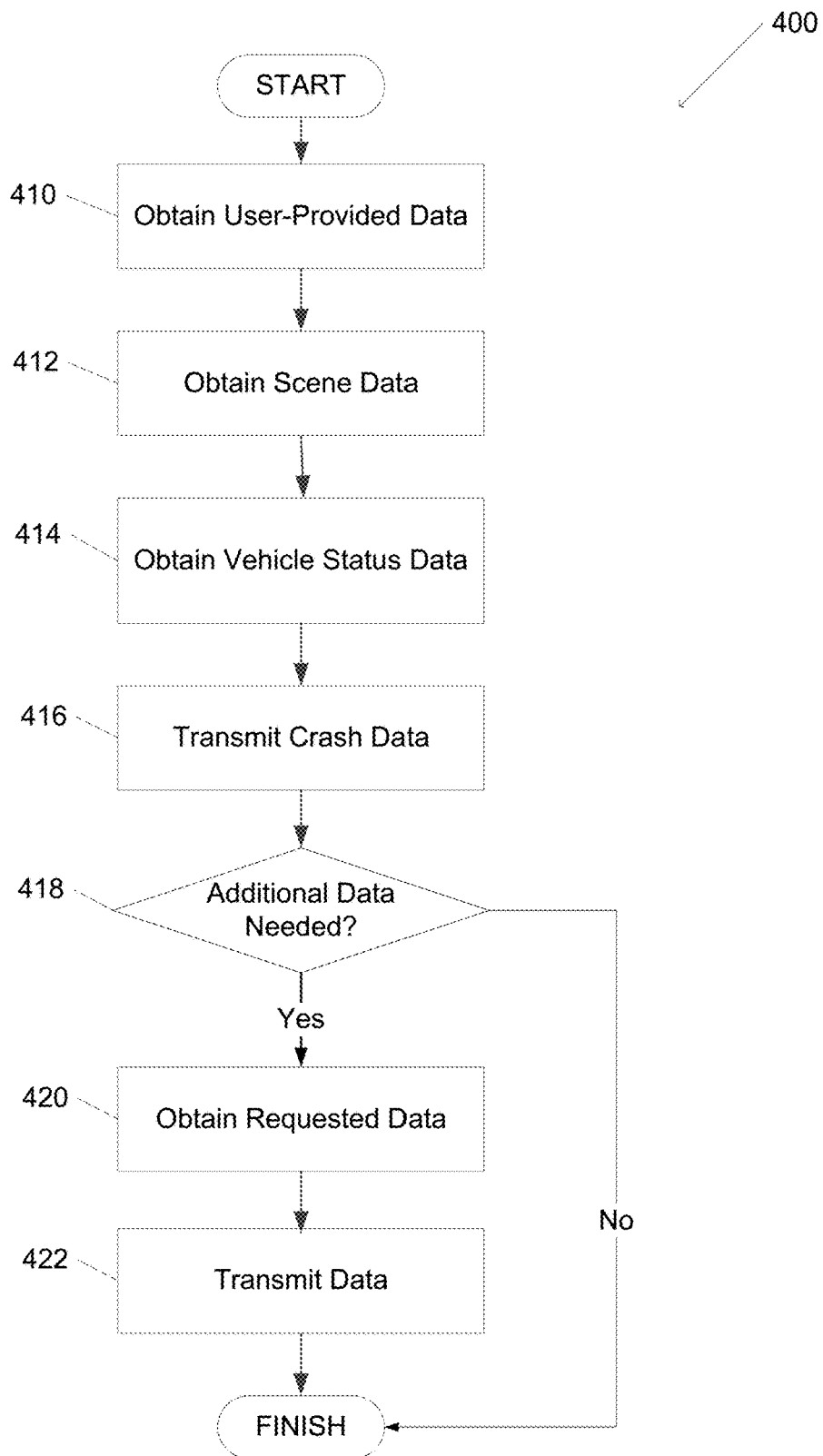
FIG. 4 is a flowchart illustrating a process for obtaining data in accordance with an embodiment of the invention.

Turning now to FIG. 4, a process for obtaining data for generating event interpretations in accordance with an embodiment of the invention is shown. The process 400 includes obtaining (410) user-provided data. Scene data is obtained (412), vehicle status data is obtained (414), and crash data is transmitted (416). If additional data is needed (418), the requested data can be obtained (420) and transmitted (422).

In many embodiments, event interpretation servers obtain a variety of data regarding damage to a vehicle and calculate liability estimates for one or more of the parties involved in the accident. A variety of user data, such as a first notice of loss, can be obtained. In a variety of embodiments, a first notice of loss includes audio data and/or text data. In a number of embodiments, audio data can be processed using any of a variety of natural language processing techniques to convert audio data to text data. Any of a variety of machine classifiers can be utilized to identify features within the text and/or audio data to extract particular information regarding the accident, the geographic location, vehicle operational data, and/or any other information as appropriate to the requirements of specific applications of embodiments of the invention. The obtained data can include geographic data identifying a particular geographic location. In several embodiments, scene data can be generated for the geographic location and/or satellite images of the geographic location can be obtained from a third-party server system. Additional information regarding the geographic location, such as the type of road, type of intersection, speed limit, road conditions, etc. can be obtained from third-party server systems, from the obtained data, and/or automatically generated based on obtained data as appropriate to the requirements of specific applications of embodiments of the invention. Additionally, weather information can be obtained for the geographic location at the time of the accident and/or at a time before and/or after the accident. A variety of vehicle operational data can be obtained from a vehicle, a telematics device, a mobile device, or via any other source as appropriate to the requirements of specific applications of embodiments of the invention. In many embodiments, the sensor data can be processed to calculate a damage model. The damage model can indicate a point of impact and/or a severity of impact for each piece of damage in the accident. The sensor data can also be utilized in the generation of scene data showing the damage, the geographic location, and the objects in the accident. Machine classifiers can be trained based on the provided data and/or historical data of crashes (or other events) having one or more similar feature vectors. In a variety of embodiments, a machine classifier is trained using historical accident data for vehicles having the same or similar make/models to the vehicle(s) involved in the accident at issue.

A variety of machine classifiers can be utilized to calculate event interpretation data based on the obtained data. The machine classifiers can calculate one or more feature vectors generated based on the images of the crash, the first notice of loss, the geographic data, the scene data, the weather data, the telematics data, and any other data related to the accident. The feature vectors can identify an estimate of the damage, the likelihood that the damage was caused by the provided data, a liability estimation for each of the parties to the accident, and/or a confidence metric. It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In some embodiments of the invention, multiclass data annotation processes can be used to train the machine classifier. In a number of embodiments, a combination of machine classifiers can be utilized, more specific machine classifiers when available, and general machine classifiers at other times can further increase the confidence in the calculation of particular feature vectors.

Once the damage has been classified using the one or more machine classifiers, the confidence metric can be compared to a threshold value (which can be determined automatically and/or predetermined) to determine if there is sufficient confidence in the calculated event interpretation data to make a recommendation as to fault. If the confidence metric does not meet the threshold, notification data requesting appropriate additional data can be generated and provided. The obtained data can then be utilized to re-calculate the event interpretation data for any feature vectors, including those identified by the confidence metrics. The calculated event interpretation data can be provided to any of a variety of user interfaces and/or third-party server systems as appropriate to the requirements of specific applications of embodiments of the invention. In a number of embodiments, the event interpretation data is combined with any of the provided data to generate a theory of defense for one or more of the parties to the accident. The theory of defense can include an estimate of the liability, a narrative of how the damage occurred, and/or a narrative of how other parties are at fault for the damage. However, the theory of defense can include any other data as appropriate to the requirements of specific applications of embodiments of the invention.

Figure 5:
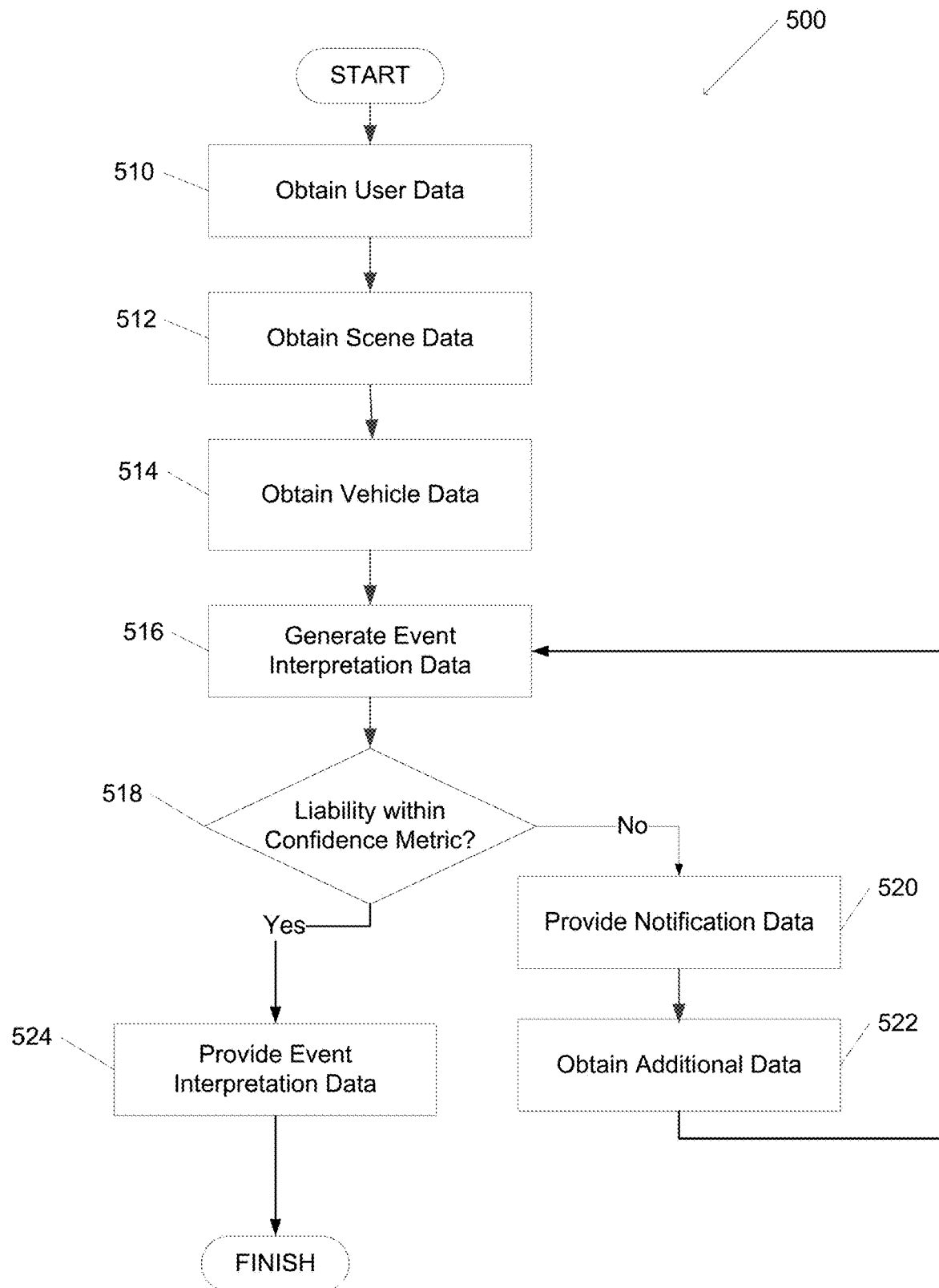
FIG. 5 is a flowchart illustrating a process for generating data in accordance with an embodiment of the invention.

Turning now to FIG. 5, a process for generating liability for damage in accordance with an embodiment of the invention is shown. The process 500 includes obtaining (510) user data, obtaining (512) scene data, and obtaining (514) vehicle operational data. Event interpretation data and/or confidence values can be generated (516). In many embodiments, the event interpretation data is calculated using one or more machine classifiers described herein and includes a confidence metric. If the confidence values are within a threshold (518), event interpretation data may be provided (524). If the confidence values are not within the threshold (518), notification data can be provided (520), additional data can be obtained (522) (in some instances, from third parties), and the event interpretation data can be re-generated (516).

In exemplary embodiments, a method, apparatus and one or more computer-readable media storing instructions storing instructions are described relating to an event interpretation system that receives information (i.e. damage information, geographical information, vehicle operation data, and the like) from a variety of sources, converts that information into relevant facts about actors and assets in a loss and then makes use of modules using analytics to automate the decisions regarding liability to understand the relational fault and ultimate damages (that could be based on the relation fault) from accountable parties.

One of ordinary skill in the art would recognize that the methods and systems discussed herein may be applied to all forms of insurance (e.g., home, auto, etc.) and financial services. For instance, the methods/systems of this disclosure may be used to process a homeowner's claim (e.g., for an insured home).

User Interfaces

A variety of user interfaces can be utilized to capture, view, and process information related to a crash and determinations of liability. The user interface can be utilized to capture and manipulate information more efficiently and more consistently. Data generated using the user interfaces may become inputs for arbitration and subrogation. User interfaces can include a variety of modules, including a claim dashboard, scene rendering, weather conditions, a loss location, statements, damages, and/or a liability analysis. A claim dashboard can include all pertinent information regarding the claim, such as drivers, vehicles, location, etc. A scene rendering can include a sketch of the scene and loss actions. Statements can include audio versions of the statements from the drivers and any other pertinent witnesses. A summary of the statement may be included and the statements may be transcribed using any of a variety of natural language processing techniques to highlight loss facts and extract pertinent and important loss facts. A variety of image data may be uploaded of the damages as well as any estimates. A liability analysis can provide key facts and any contributing factors, such as speed, right of way, danger recognition, evasive action, additional negligence, point of impact, location on roadway, any differences between statements regarding a particular factor from multiple parties, and/or a theory of defense for one or more parties. The theory of defense can include a liability range (which may be expressed as a percentage of fault, a rating factor, or in any other form) listing and details of key factors for the determination of the theory of defense, and/or a confidence metric in the liability range and/or key factors.

Figure 6A:
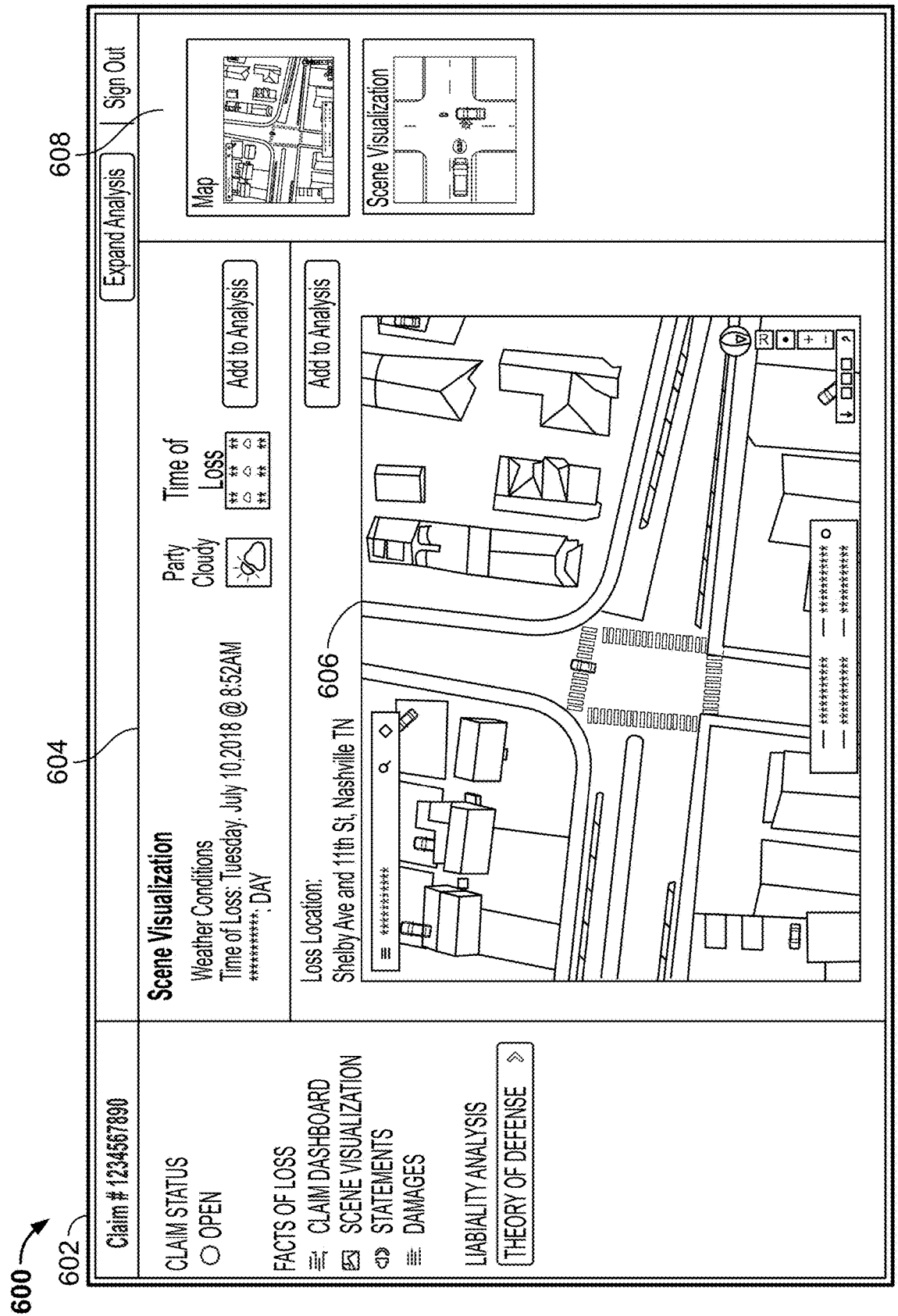

Turning now to FIG. 6A, a screenshot of a user interface for visualizing a scene in accordance with an embodiment of the invention is shown. The user interface 600 includes a navigation pane 602, a weather report 604, images of the scene 606, and an object overview 608. The navigation pane 602 includes a variety of links to different aspects of the liability generation process, including a claim dashboard, the scene visualization, witness statements, an overview of the damages, and the system generated theory of defense. The weather conditions 604 can include the temperature, humidity, precipitation, and/or any other weather conditions for the geographic location of the scene. The images of the scene can include any images corresponding to the identified geographic location, including satellite image data, drone or other unmanned aerial vehicle images, or the like. In a variety of embodiments, the weather conditions and/or images of the scene are obtained from one or more third-party server systems. The object overview 608 can allow for an efficient transition between the visualization of the scene and the placement of objects within the scene, along with providing thumbnail images of both the scene itself and the object placements.

Figure 6B:
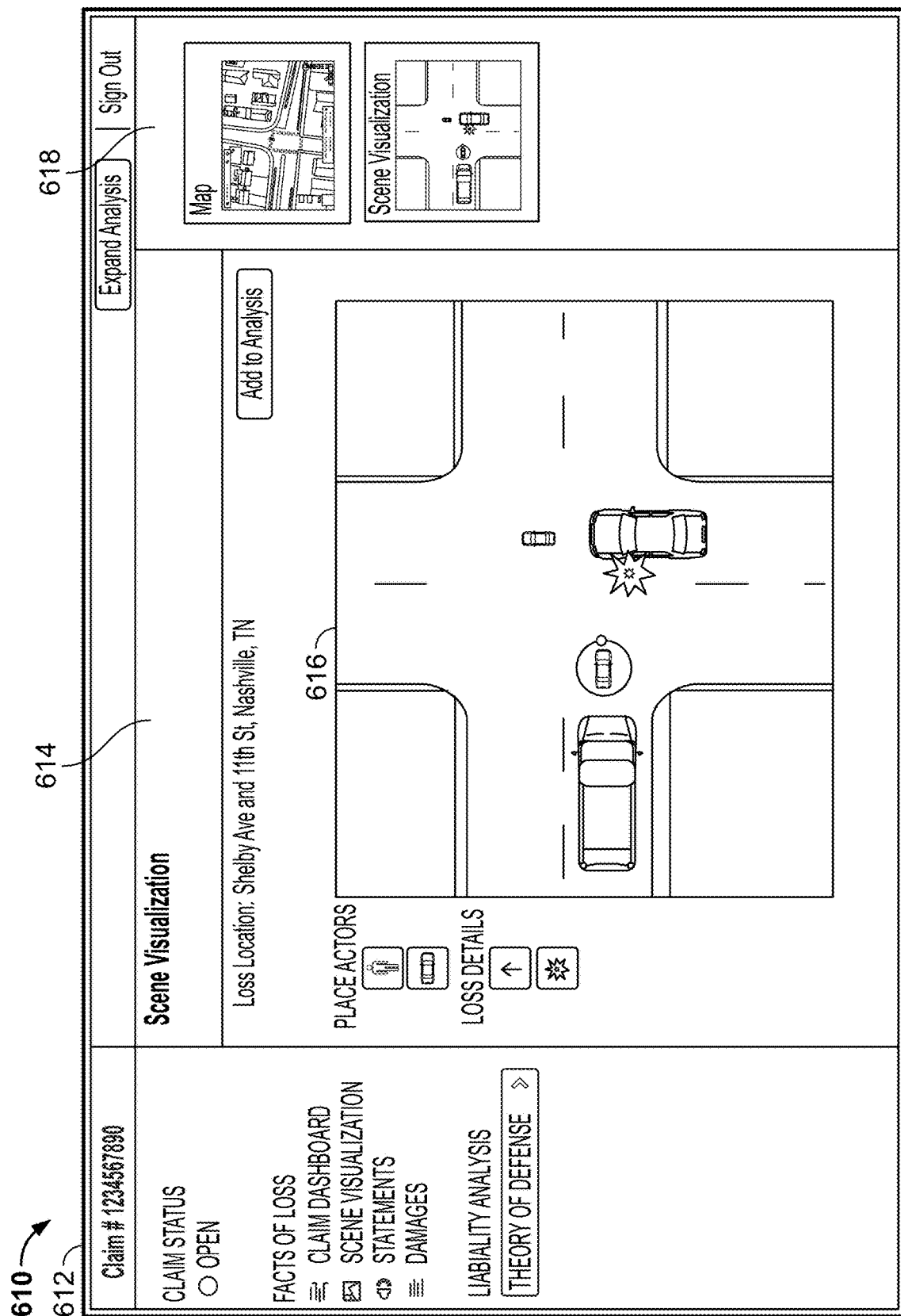

Turning now to FIG. 6B, a screenshot of a user interface for placing objects within a scene in accordance with an embodiment of the invention is shown. The user interface 610 includes a navigation pane 612, location information 614, a scene rendering 616, and an object overview 618. The location information 614 can include the geographic coordinates of the scene and/or the address of the scene. In several embodiments, the address of the scene is obtained by reverse geocoding the geographic coordinates and/or an IP address associated with a mobile device providing data using a third-party server system. The scene rendering 616 can include a conceptual rendering of the scene generated dynamically based on the satellite images of the scene. The scene rendering also includes a variety of objects, such as vehicles, actors, and loss details, which can be dynamically placed within the conceptual rendering. In a variety of embodiments, the vehicles, actors, and/or loss details are automatically located within the scene rendering based on the provided data regarding the claim. The navigation pane 612 and object overview 618 can operate as described herein.

Turning now to FIG. 6C, a screenshot of a user interface for reviewing and editing statements in accordance with an embodiment of the invention is shown. The user interface 620 includes a navigation pane 622, statement summaries 624, and object overview 626. The statement summaries 624 can include both a recorded statement (including audio-only and video recordings) and a text transcription of the statement. In a number of embodiments, the text transcription is generated automatically based on the recorded statement. A variety of statements from any parties, including the insured, any claimants, witnesses, and responders to the scene can be included as appropriate to the requirements of specific applications of embodiments of the invention. The navigation pane 622 and object overview 626 can operate as described herein.

Turning now to FIG. 6D, a screenshot of a user interface for reviewing and editing images in accordance with an embodiment of the invention is shown. The user interface 630 includes a navigation pane 632, a collection of images 634, and an object overview 636. The collection of images 634 can include any images and/or video provided by any parties, including the insured, any claimants, witnesses, and responders to the scene can be included as appropriate to the requirements of specific applications of embodiments of the invention. In many embodiments, the photos include images and/or video captured by a vehicle before, during, and/or after an accident. The navigation pane 632 and object overview 636 can operate as described herein.

Figure 6E:
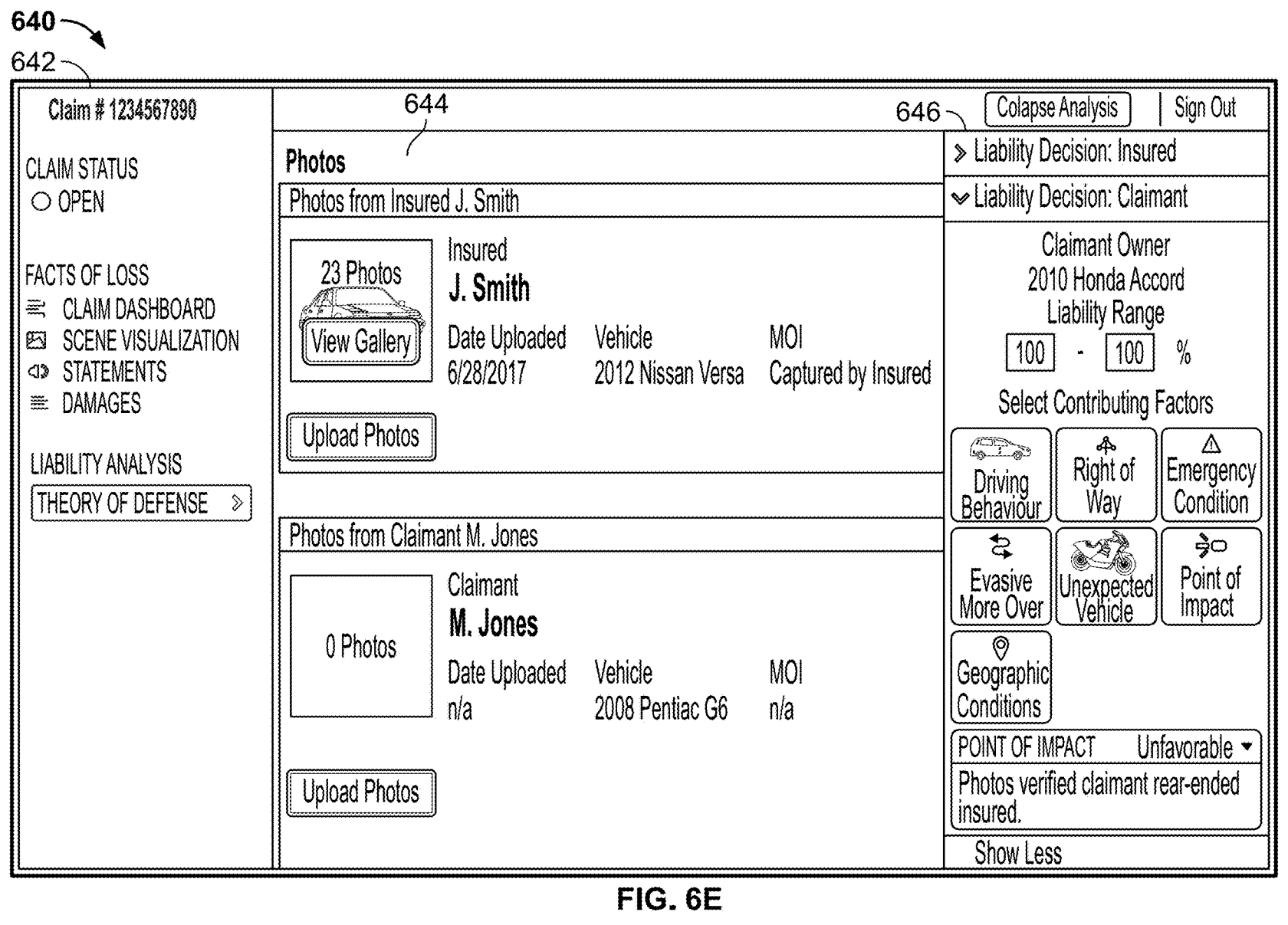

Turning now to FIG. 6E, a screenshot of a user interface for reviewing and editing calculated liabilities in accordance with an embodiment of the invention is shown. The user interface 640 can include a navigation pane 642, a listing of information 644, and a liability summary 646. The navigation pane 642 can operate as described herein. The listing of information 644 can include any of the data related to the claim, including a scene visualization, scene rendering, statement summaries, and/or images as described herein. The liability summary 646 can include an estimated liability and/or a range of liability for each party. The liability summary can further include one or more contributing factors to the liability determination and/or information describing the contributing factors. In several embodiments, the selection of liability factors and/or information can be utilized using one or more machine classifiers to calculate the liability for each party. In a variety of embodiments, the liability range is based on a calculated probability of liability for each party in the claim and/or a confidence metric in the calculated probability of liability.

Figure 6F:
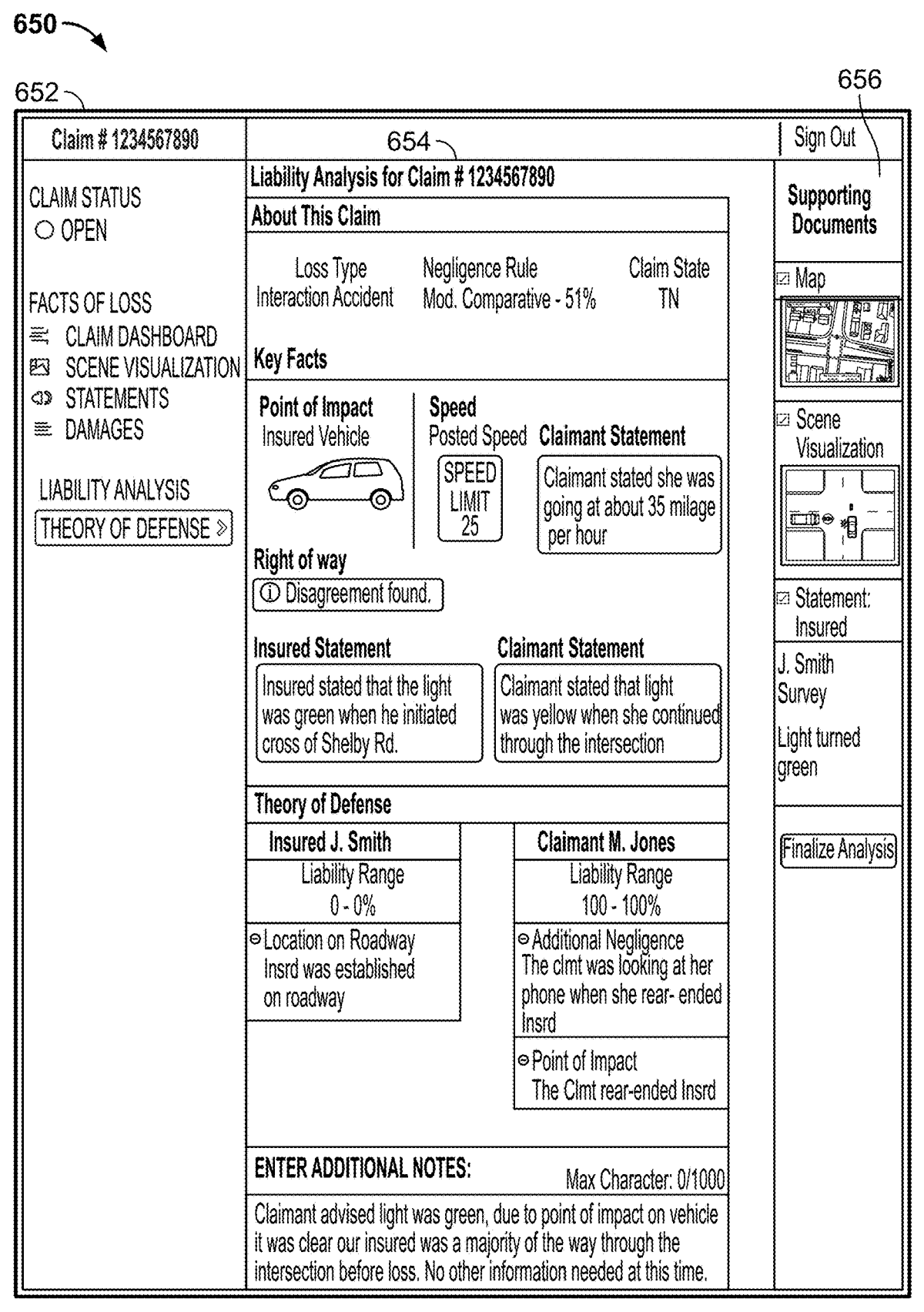

Turning now to FIG. 6F, a screenshot of a user interface for analyzing a liability determination in accordance with an embodiment of the invention is shown. The user interface 650 includes a navigation pane 652, a liability analysis 654, and an object overview 656. The navigation pane 652 and object overview 656 can operate as described herein. The liability analysis 654 can include any data utilized in the determination of liability for each party. In a variety of embodiments, the data includes one or more feature vectors generated using machine classifiers and/or a confidence metric in the likelihood of liability for each of the one or more feature vectors. The liability analysis 654 can also include a summary of any of the information described herein such as the geographic location, metadata describing the geographic location, placement of objects within the scene, summary of the damage, and any other notes regarding the claim. In a number of embodiments, the liability analysis 654 includes notifications regarding discrepancies in data provided by two or more parties with respect to a particular aspect of the claim. For example, in an accident in an intersection, each party may have stated that they had the right of way and the liability analysis can indicate that each party claimed to have the right of way to cross the intersection. The liability analysis 654 could also include information regarding relational fault and/or liability range. In some embodiments, the relational fault could be expressed in terms or percentages (i.e. percentage of relational fault of each party involved in the event), or a pre-determined scale.

Liability or ultimately, the damages, could be assigned based on the relational fault of the parties involved in the event.

A variety of user interfaces that can be utilized in many embodiments of the invention are shown in FIGS. 6A-F. However, it should be noted that a variety of other user interfaces can be utilized as appropriate to the requirements of specific applications of embodiments of the invention.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer-readable medium. Any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A system, comprising:
   at least one processor; and
   memory storing instructions that, when executed by the at least one processor, cause the system to:
   receive, from a capture device, at least one indicator of damage to an object, the at least one indicator of damage comprising image data;
   receive, from a telematics device associated with the object, object operational data comprising an indication of a speed of the object and an acceleration of the object;
   receive, from a third-party server system, scene data identifying a particular geographic location, satellite image data corresponding to the particular geographic location, and a speed limit associated with the geographic location; and
   generate, by at least one machine classifier and based on the object operational data, the at least one indicator of damage to the object, and the scene data, event interpretation data for each of the at least one indicators of damage, wherein the event interpretation data comprises:
   a damage model generated by the at least one machine classifier based on the image data,
   a confidence metric comprising a likelihood of liability for the at least one indicators of damage,
   an indication of how the damage occurred, and
   an indication of a party that is at fault.

2. The system of claim 1, wherein the system further includes instructions that, when executed, cause the system to:
   generate notification data identifying the indicator of damage when the confidence metric is below a threshold value for an indicator of damage;
   receive additional data based on the on the notification data; and
   re-calculate the event interpretation data based on the at least one indicator of damage to the object, the object operational data, the scene data, and the additional data.

3. The system of claim 2, wherein the event interpretation data is recalculated for each of the indicators of damage.

4. The system of claim 1, wherein:
   the at least one indicator of damage to the object comprises audio data; and
   further including instructions that, when executed, cause the system to:
   generate text data based on the audio data; and
   calculate one or more of the indicators of damage to the object based on the text data.

5. The system of claim 1, further including instructions that, when executed, cause the system to:
   generate a scene rendering for the particular geographic location based on the event interpretation data and the satellite image data;
   generate a user interface comprising the scene rendering and the event interpretation data; and
   provide the user interface.

6. A computer-implemented method, comprising:
   receiving, from a capture device, at least one indicator of damage to an object, the at least one indicator of damage comprising image data;
   receiving, from a telematics device associated with the object, object operational data comprising an indication of a speed of the object and an acceleration of the object;
   receiving, from a third-party server system, scene data identifying a particular geographic location, satellite image data corresponding to the particular geographic location, and a speed limit associated with the geographic location; and
   generating, by at least one machine classifier and based on the object operational data, the at least one indicator of damage to the object, and the scene data, event interpretation data for each of the at least one indicators of damage, wherein the event interpretation data comprises:
   a damage model generated by the at least one machine classifier based on the image data,
   a confidence metric comprising a likelihood of liability for the at least one indicators of damage
   an indication of how the damage occurred, and
   an indication of a party that is at fault.

7. The computer-implemented method of claim 6, further comprising:
   generating notification data identifying the indicator of damage when the confidence metric is below a threshold value for an indicator of damage;
   receiving additional data based on the on the notification data; and regenerating the event interpretation data based on the at least one indicator of damage to the object, the object operational data, the scene data, and the additional data.

8. The computer-implemented method of claim 7, wherein the event interpretation data is recalculated for each of the indicators of damage.

9. The computer-implemented method of claim 6, wherein:
the at least one indicator of damage to the object comprises audio data; and
the method further comprises:
generating text data based on the audio data; and
calculating one or more of the indicators of damage to the object based on the text data.

10. The computer-implemented method of claim 6, further comprising:
generating a scene rendering for the particular geographic location based on the event interpretation data and the satellite image data;
generating a user interface comprising the scene rendering and the event interpretation data; and
providing the user interface.

11. A non-transitory computer-readable medium storing instructions for controlling a processor, the instructions causing the processor to perform steps comprising:
receiving, from a capture device, at least one indicator of damage to an object the at least one indicator of damage comprising image data;
receiving, from a telematics device associated with the object, object operational data comprising an indication of a speed of the object and an acceleration of the object;
receiving, from a third-party server system, scene data identifying a particular geographic location, satellite image data corresponding to the particular geographic location, and a speed limit associated with the geographic location; and
generating, by at least one machine classifier and based on the object operational data, the at least one indicator of damage to the object, and the scene data, event interpretation data for each of the at least one indicators of damage, wherein the event interpretation data comprises:
a damage model generated by the at least one machine classifier based on the image data,
a confidence metric comprising a likelihood of liability for the at least one indicators of damage,
an indication of how the damage occurred, and
an indication of a party that is at fault.

12. The non-transitory computer-readable medium of claim 11, wherein the instructions further cause the processor to perform steps comprising:
generating notification data identifying the indicator of damage when the confidence metric is below a threshold value for an indicator of damage;
receiving additional data based on the on the notification data; and
regenerating the event interpretation data based on the at least one indicator of damage to the object, the object operational data, the scene data, and the additional data.

13. The non-transitory computer-readable medium of claim 12, wherein the event interpretation data is recalculated for each of the indicators of damage.

14. The non-transitory computer-readable medium of claim 11, wherein:
the at least one indicator of damage to the object comprises audio data; and
the instructions further cause the processor to perform steps comprising:
generating text data based on the audio data; and
calculating one or more of the indicators of damage to the object based on the text data.

15. The non-transitory computer-readable medium of claim 11, wherein the instructions further cause the processor to perform steps comprising:
generating a scene rendering for the particular geographic location based on the event interpretation data and the satellite image data;
generating a user interface comprising the scene rendering and the event interpretation data; and
providing the user interface.

* * * * *